United States Patent [19]
Mueller

[11] Patent Number: 4,715,580
[45] Date of Patent: Dec. 29, 1987

[54] SWINGING DEVICE

[76] Inventor: Fritz Mueller, Neuer Wasen 6, 7118 Ingelfingen-Criesbach, Fed. Rep. of Germany

[21] Appl. No.: 15,222

[22] Filed: Feb. 17, 1987

[30] Foreign Application Priority Data

May 6, 1986 [DE] Fed. Rep. of Germany ....... 3615368

[51] Int. Cl.[4] ...................... F16K 31/04; F16K 31/53
[52] U.S. Cl. .................... 251/229; 74/89.15; 74/424.8 VA; 251/129.12; 251/249.5
[58] Field of Search ................ 74/89.15, 424.8 VA; 251/129.11, 129.12, 229, 248, 249.5, 264, 266

[56] References Cited

U.S. PATENT DOCUMENTS

| | | | |
|---|---|---|---|
| 1,033,577 | 7/1912 | Gille | 251/129.12 |
| 3,063,298 | 11/1962 | Elliott | 251/229 |
| 3,318,171 | 5/1967 | Wilkinson et al. | 251/229 |
| 3,575,378 | 4/1971 | Fawkes | 251/229 |
| 3,774,462 | 11/1973 | Thompson | 74/424.8 VA |
| 3,877,677 | 4/1975 | Daghe et al. | 251/229 |
| 4,625,758 | 12/1986 | Murray | 251/229 |

FOREIGN PATENT DOCUMENTS 2106933 4/1979 Fed. Rep. of Germany ..... 74/424.8 VA

Primary Examiner—George L. Walton
Attorney, Agent, or Firm—Henry M. Feiereisen

[57] ABSTRACT

A swinging device for controlling opening and closing of a shut-off valve or the like includes an oscillating crank which is pivoted with its one end to a nut reciprocating on a spindle driven by an electromotor via a gear transmission. The oscillating crank swings between two end positions and is provided with an elongated slot in which a prolongation of a coupling member projects in shiftable but non-rotational manner. In both end positions of the crank which correspond to the respective opening position and closing position of the shut-off valve, a maximum torque is exerted on the switch shaft because the distance of the point of articulation of the crank to the nut from the rotational axis of the switch shaft is at a maximum.

13 Claims, 4 Drawing Figures

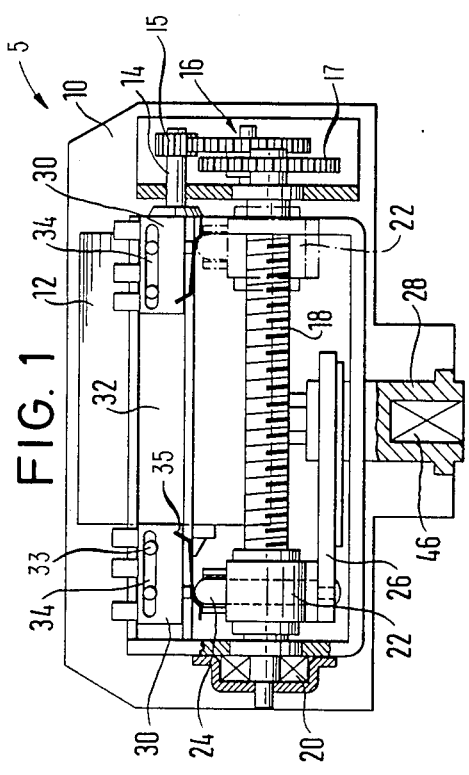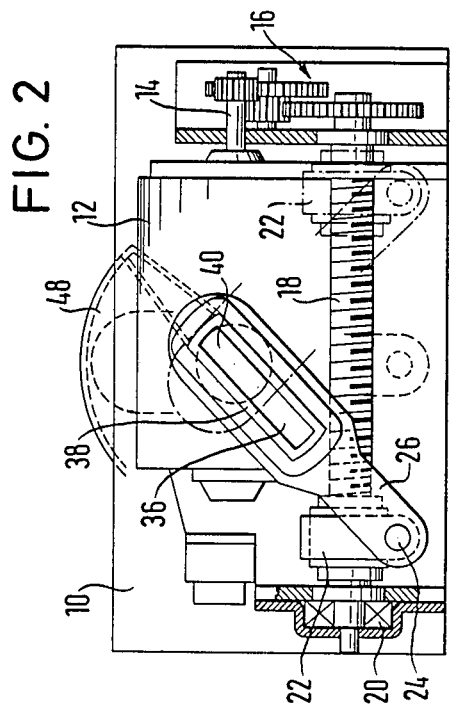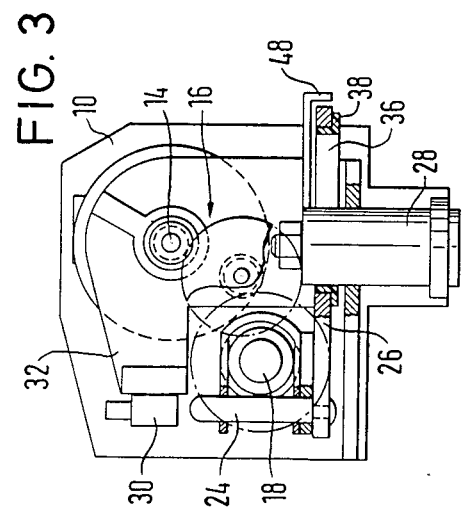

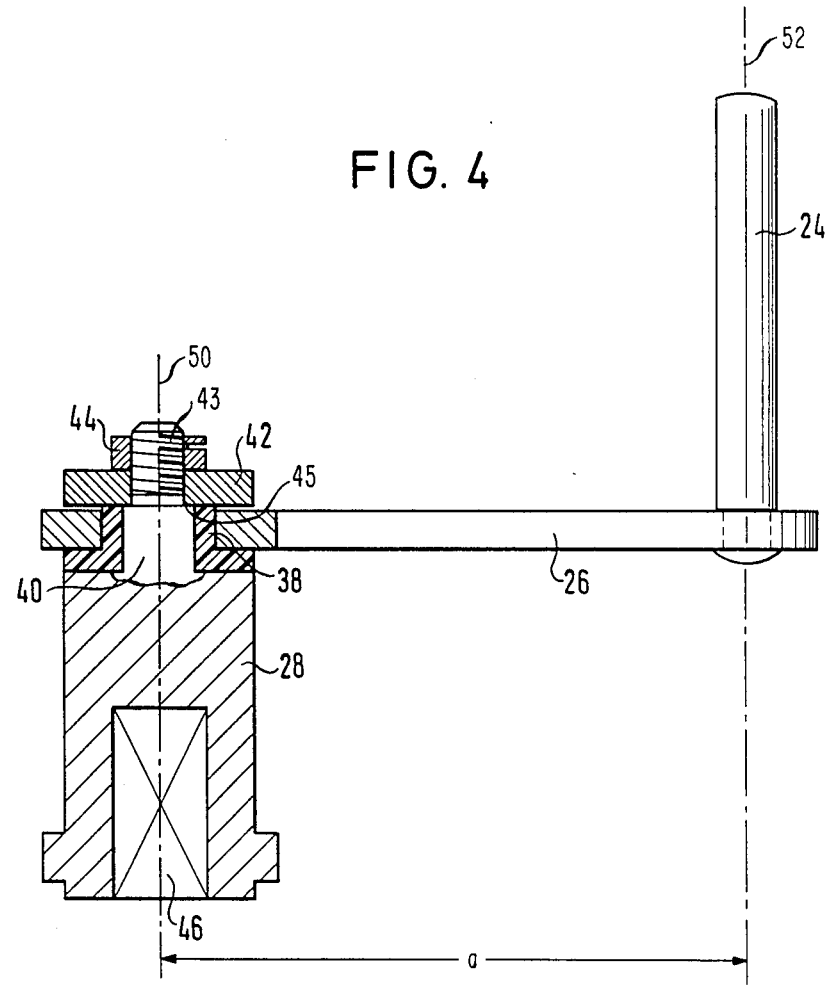

4,715,580

SWINGING DEVICE

FIELD OF THE INVENTION

The present invention refers to a swinging device, in particular an electromotive swinging device for opening and closing a shut-off valve for a pipeline.

BACKGROUND OF THE INVENTION

Such swinging devices include an electromotor which actuates via a gear transmission a threaded spindle on which a nut reciprocates. The nut is linked to a switch shaft via an oscillating element for opening and closing the shut-off valve.

It is one object of the present invention to provide a swinging device of this kind with improved power transmission at reduced demand of space and simpler construction.

This object and others which will become apparent hereinafter are realized according to the invention by providing an oscillating crank which swings between two end positions and exerts in these positions maximum torque onto the shut-off valve.

The crank is pivoted to the nut in such a manner that from its point of articulation to the nut, it has a distance to the rotating axis about which the switch shaft is rotated during swinging of the crank which distance is at a maximum when said crank is in its end positions.

According to the invention, the switch shaft is provided with a square prolongation which projects into an elongated slot of the crank so as to provide a slidable but non-rotational linkage between the switch shaft and the crank.

The surface of the crank defining the slot is lined with a synthetic coating, as e.g. Delrin in order to reduce friction therebetween. Since the elongated slot is closed, an accurate and improved connection between the oscillating crank and the switch shaft in comparison to known swinging devices is obtained. In addition, an enclosed elongated slot prevents a tilting of the switch shaft when the crank is in its end positions.

In order to provide the reciprocation of the nut via the threaded spindle and thus of the swinging motion of the crank, limit switches are provided which are adjustably attached to a switch carrier so as to allow a modification of the stroke of the oscillating crank.

Advantageously, the crank cooperates with an indicator so that each position of the crank is indicated during swinging between its end positions.

BRIEF DESCRIPTION OF THE DRAWING

The above and other objects, features and advantages of the present invention will now be described in more detail with reference to the accompanying drawing in which:

FIG. 1 is a partial sectional front view of one embodiment of a swinging device according to the invention;

FIG. 2 is a partial sectional top view of the swinging device according to FIG. 1;

FIG. 3 is a partial sectional side view of the swinging device according to FIG. 1; and FIG. 4 is a partial sectional view of the swinging device according to the invention with the switch shaft and the oscillating crank illustrated in detail.

DESCRIPTION OF A PREFERRED EMBODIMENT

Referring firstly to FIG. 1, there is shown a partial sectional front view of one embodiment of a swinging device according to the invention and generally designated by reference numeral 5. The swinging device 5 cooperates with e.g. the element to be oscillated of a not shown shut-off valve or butterfly valve for a pipeline and includes a motor frame or casing 10 which accommodates an electromotor 12 extending toward the rear of the motor casing 10. The electromotor 12 includes a main shaft 14 which cooperates with a gear 15 of a gear transmission 16 for driving the latter. In the present embodiment of the invention, the gear transmission 16 is a two-stage toothed gearing whose output gear 17 is mounted on one end of a threaded spindle 18 which is arranged in a forward portion of the casing 10. The other axial end of the spindle 18 is supported in bearings 20 which together with the electromotor 12 and gear transmission 16 is accommodated within and supported by the motor casing 10.

Cooperating with the spindle 18 is a nut 22 which runs between two end positions on the spindle 18 during rotation of the latter. The respective end positions of the nut 22 are shown in continuous line on the left hand side and in dash-dotted line on the right hand side in FIG. 1.

The nut 22 is laterally traversed by a pin 24 which extends perpendicular to the spindle 18 and projects with its both ends beyond the nut 22. As shown in FIG. 1, the lower end of the pin 22 is fixedly connected to an oscillating crank 26 e.g. by means of a rivet 25 (FIG. 4). As will be explained in more detail furtherbelow, the oscillating crank 26 swings back and forth when the nut 22 reciprocates on the spindle 18.

At a distance to the pin 24, the oscillating crank 26 is provided with a closed elongated slot 36. Projecting into the elongated slot 36 is a stepped prolongation 40 which forms the upper part of a coupling member such as a switch shaft or switch sleeve 28. The prolongation 40 has a square cross section so as to be slidably guided in the elongated slot 36. Thus, the linkage of the switch shaft 28 with the oscillating crank 26 allows a relative shifting therebetween but prevents a rotation of the switch shaft 28 relative to the crank 26. The surface of the crank 26 defining the elongated slot 36 is preferably lined with a coating 38 of synthetic material e.g. Delrin in order to reduce friction during movement of the prolongation 40 within the slot 36.

At its lower end, the switch shaft 28 includes a central square hole 46 engageable in non-rotational manner by the respective element of a shut-off valve or the like (not shown) so that the swinging motion of the crank 26 is transmitted via the switch shaft 28 to the respective element for actuating the shut-off valve.

As is shown in FIG. 4, the prolongation 40 is further provided with a graduated thread section 43 to define a shoulder 45 which flushes with the coating 38. Slipped on the threaded section 43 is a disk 42 which is supported above the elongated slot 36 by the shoulder 45 and the coating 38 at a slight distance to the facing surface of the crank 26 so that the latter is not obstructed during its swinging motion. The disk 42 is tightened by a nut 44 screwed on the threaded section 43 to complete the linkage between the crank 26 and the switch shaft 28.

Still referring to FIG. 1, there can be seen that the upper end of the pin 24 cooperates with switch levers 35 of respectively spaced limit switches 30 such that the switch lever 35 of the pertaining limit switch 30 is contacted by the pin 24 in each end position of the nut 22. The limit switches 30 are attached to a support 32 e.g. via screws or other suitable fasteners 33. Preferably, each limit switch 30 is provided with an elongated slot 34 which extends parallel to the spindle 18 and through which the fasteners 33 project to attach the limit switch 30 to the switch carrier 32. Consequently, by altering the position of the limit switches 30 on the carrier 30, the end positions as covered by the nut 22 on the spindle 18 and thus the stroke of the crank 26 are adjustable.

Advantageously, the crank 26 cooperates with an indicator 48 in form of a disk so that each position of the crank 26 and thus of the shut-off valve can be monitored.

In a preferred embodiment of the invention, the threaded spindle 18 is designed as ballscrew while the nut 22 is a ball-type nut so as to reduce the friction between the spindle 18 and the nut 22. It is also within the scope of the invention to provide the nut 22 of synthetic material.

After having described the individual parts of a preferred embodiment of a swinging device according to the invention, its mode of operation will now be described in more detail.

When starting the electromotor 12, the gear transmission rotates the threaded spindle 18 so that the nut 22 is moved in axial direction thereof until the pin 24 contacts one of the switch levers 35. At this point, the pertaining limit switch 30 is actuated and the electromotor 12 and the rotational direction of the spindle 18 is reversed. The nut 22 then moves in opposite direction on the spindle 18 until the pin 24 contacts the switch lever 35 of the other limit switch 30 for actuating the latter and reversing the electromotor 12 again.

Controlled by the limit switches 30, the nut 22 moves back and forth along the threaded spindle 18. Simultaneously with the reciprocating movement of the nut 22, the crank 26 which is swingably mounted to the nut 22 oscillates as illustrated in FIG. 2. In view of the non-rotational linkage of the square prolongation 40 within the elongated slot 36, the switch shaft 28 is rotated about its fixed rotating axis 50 in dependence on the movement of the crank 26 at least about an angle of 90° so that the shut-off valve opens and closes via the element which is engaged tightly in the square hole 46 of the switch shaft 28.

In FIG. 2, various positions of the oscillating crank 26 are shown during the movement of the nut 22 on the spindle 28 for rotating the switch shaft 28 and thus the respective element of e.g. the shut-off valve about 90°. In continuous line, the crank 26 is shown in its left end position; the broken line illustrates the central position thereof in which the switch shaft 28 is turned by about 45° and the dash-dotted line shows the right end position of the crank 26 in which the switch shaft 28 is now turned by about 90°.

The linkage of the oscillating crank 26 with the switch arm 28 and thus with the shut-off valve is provided in such a manner that the switch arm 28 reaches its closed position when the crank 26 is in its one end position and is in its open position when the crank 26 is in the other end position.

Therefore, the torque exerted by the crank 26 onto the switch shaft 28 in the opening position as well as in the closing position of the shut-off valve reaches a maximum since in these end positions of the crank 26, the lever arm for rotating the switch shaft 28 about its rotational axis 50 i.e. the distance a between the center axis 52 of the pin 24 and the rotational axis 50 of the switch arm 28 is at a maximum.

During oscillation of the crank 26 between the end positions, the distance a and thus the lever arm is reduced and reaches a minimum in the central position of the crank 26. During its displacement from the end positions to the central position, the crank 26 is moved relative to the switch shaft 28 towards the rear of the motor casing 10 and thus projects rearwards beyond the switch shaft 28. Since the electromotor 12 and the gear transmission 16 are arranged in the rear section of the device, no additional space is required for the crank 26 when being shifted towards the rear.

Advantageously the crank 26 is pivoted to the nut 22 via the pin 24 so that in contrast to known swinging devices no additional space is required at the forward section of the crank 26, i.e. at the connection of the crank 26 and the pin 24 with the nut 22.

While the invention has been illustrated and described as embodied in a Swinging Device, it is not intended to be limited to the details shown since various modifications and structural changes may be made without departing in any way from the spirit of my present invention.

What is claimed as new and desired to be protected by Letters Patent is set forth in the appended claims:

1. A swinging device for transmitting swinging motion to an element of a shut-off valve or the like for opening and closing the latter, comprising:
    a casing,
    a rotatable spindle member extending within said casing; and
    oscillating means adapted to cooperate with the element and operatively connected with said spindle member for swinging between two end positions in such a manner that a maxmum torque is exerted on the element when said oscillating means is in said end positions, said oscillating means including a nut adapted to move along said spindle member between said end positions, an oscillating crank having one end and another end, said one end being pivotally connected directly to said nut and moving along a straight line without being shifted toward said casing when said crank is moved between said end positions, and a coupling member operatively connected to said element and cooperating with said other end of said crank in such a manner that said coupling member is slidably received in said crank in a non-rotational manner so as to achieve said straight line movement for preventing said shifting.

2. A swinging device as defined in claim 1 wherein said coupling member defines a rotational axis, said one end of said crank defining a central axis spaced from said rotational axis of said coupling member by a distance which is at a maximum when said crank is in said end positions.

3. A swinging device as defined in claim 2 wherein said oscillating means further includes a pin traversing said nut, said crank being fixedly connected to said pin.

4. A swinging device as defined in claim 3 wherein said casing defines a front section, said pin laterally traversing said nut in vicinity of said front section so that said crank is pivoted to said pin laterally offset to said spindle member.

5. A swinging device as defined in claim 2 wherein said coupling member has a lower end remote to said crank provided with a square hole for attachment of the element.

6. A swinging device as defined in claim 1 wherein said crank includes an elongated slot, said coupling member having an upper end projecting into said elongated slot to provide the non-rotational guidance of said crank relative to said coupling member.

7. A swinging device as defined in claim 6 wherein said crank has a surface defining said elongated slot, and further comprising a coating of synthetic material lining said surface for reducing friction between said crank and said coupling member.

8. A swinging device as defined in claim 7 wherein said coating is made of Delrin.

9. A switching device as defined in claim 1, and further comprising switching means for controlling the swinging range of said oscillating means and including at least two limit switches spaced from each other at a suitable distance for defining said end positions and reversing swinging of said oscillating means when reaching said end positions.

10. A swinging device as defined in claim 9 wherein said limit switches are provided with elongated slots, and further comprising a switch carrier accommodated in said casing for supporting said limit switches, and fastening means for adjustably attaching said limit switches to said switch carrier via said elongated slots.

11. A swinging device as defined in claim 1, and further comprising indicating means cooperating with said oscillating means for displaying each respective position during swinging of said oscillating means.

12. A swinging device as defined in claim 1 wherein said spindle member is a ballscrew.

13. A swinging device as defined in claim 12 wherein said nut is a ball-type nut.

* * * * *